United States Patent
Wood et al.

(10) Patent No.: US 9,132,844 B2
(45) Date of Patent: Sep. 15, 2015

(54) MOUNTING ARRANGEMENT

(75) Inventors: Daniel Wood, Watsonia North (AU);
Dion Marriott, Ferntree Gully (AU)

(73) Assignee: SIEMENS RAIL AUTOMATION PTY. LTD, Melbourne (AU)

( * ) Notice: Subject to any disclaimer, the term of this patent is extended or adjusted under 35 U.S.C. 154(b) by 275 days.

(21) Appl. No.: 13/541,895

(22) Filed: Jul. 5, 2012

(65) Prior Publication Data

US 2013/0008094 A1    Jan. 10, 2013

(30) Foreign Application Priority Data

Jul. 6, 2011    (AU) ................................ 2011902689

(51) Int. Cl.
| | | |
|---|---|---|
| *F21V 21/116* | (2006.01) | |
| *B61L 5/18* | (2006.01) | |
| *F21S 8/08* | (2006.01) | |
| *F16M 11/04* | (2006.01) | |
| *F16M 13/02* | (2006.01) | |
| *F16M 11/10* | (2006.01) | |
| *F16M 11/20* | (2006.01) | |
| *F16M 11/22* | (2006.01) | |

(52) U.S. Cl.
CPC ................. *B61L 5/1863* (2013.01); *B61L 5/18* (2013.01); *B61L 5/1854* (2013.01); *B61L 5/1872* (2013.01); *F16M 11/041* (2013.01); *F16M 11/10* (2013.01); *F16M 11/2014* (2013.01); *F16M 11/22* (2013.01); *F16M 13/022* (2013.01); *F21S 8/088* (2013.01); *F21V 21/116* (2013.01)

(58) Field of Classification Search
CPC ....... B61L 5/18; B61L 5/1854; B61L 5/1863; B61L 5/1872; F21V 21/116; F21S 8/088; F16M 11/041; F16M 13/022
USPC .......... 248/218.4, 278.1, 219.1, 219.2, 227.3, 248/230.1, 230.5; 246/473.3; 362/431, 282
See application file for complete search history.

(56) References Cited

U.S. PATENT DOCUMENTS 1,666,102 A * 4/1928 McCarthy .................. 248/278.1
1,682,693 A * 8/1928 Day .......................... 248/274.1
(Continued)

FOREIGN PATENT DOCUMENTS

| GB | 2417549 A | 3/2006 |
|---|---|---|
| GB | 2457881 | 9/2009 |

OTHER PUBLICATIONS

Australian Office Action mailed Apr. 29, 2014 corresponding to Australian Application No. 2012203944 filed Jul. 5, 2012 (5 pages).

*Primary Examiner* — Terrell McKinnon
*Assistant Examiner* — Eret McNichols

(57) ABSTRACT

A mounting arrangement 10 for mounting a utility 26 to an end 16 of a post 17. The mounting arrangement 10 includes an attachment member 11 for attachment to the post 17 fixed against rotation when attached to the post 17. A rotatable member 12 is connected to the attachment member 11 and is rotatable relative to the attachment member 11 about the axis of the post 17. The rotatable member 12 includes a connection arrangement 13 for connecting a utility 26 to the rotatable member 12, so that the utility 26 can rotate with the rotatable member 12. The rotatable member 12 is rotatable between first and second positions. A cooperating arrangement comprising at least one abutment 35, 37, 38, 42 is provided for cooperation with the rotatable member 12 to facilitate accurate return of the rotatable member 12 from the second position to the first position.

16 Claims, 5 Drawing Sheets

(56) References Cited

U.S. PATENT DOCUMENTS

| | | | |
|---|---|---|---|
| 1,744,963 A | 1/1930 | Handlan | |
| 1,748,913 A * | 2/1930 | Day | 246/473.3 |
| 1,794,617 A * | 3/1931 | Howe | 248/278.1 |
| 1,842,224 A * | 1/1932 | Wells | 248/278.1 |
| 1,936,260 A * | 11/1933 | Peabody | 246/473.3 |
| 1,969,089 A * | 8/1934 | Merkel | 246/473.3 |
| 2,145,788 A * | 1/1939 | Field | 248/230.9 |
| 3,586,280 A * | 6/1971 | Parduhn | 248/214 |
| 5,433,166 A * | 7/1995 | Donatello et al. | 116/202 |
| 5,690,426 A * | 11/1997 | Sherman | 362/410 |
| 7,261,263 B2 * | 8/2007 | Baker et al. | 248/218.4 |

\* cited by examiner

MOUNTING ARRANGEMENT

CROSS-REFERENCE TO RELATED APPLICATIONS

This application claims the priority of Australian Application No. 2011902689, filed on Jul. 6, 2011. The content of the foregoing application is hereby incorporated by reference in its entirety.

FIELD OF THE INVENTION

The present invention relates to a mounting arrangement for mounting a utility, such as a signalling unit, to the end of a post. The invention has been developed specifically for use in a railway setting, for mounting railway signal units to posts which are positioned to the side of railway tracks and which provide signals to train drivers. It will be appreciated however, that the invention will have wider applicability and for example, will be applicable to many forms of post mounted lighting, signalling or other utility.

BACKGROUND OF THE INVENTION

Railway signalling forms a critical part of the proper operation of a railway network. The signals provided to train drivers for example, enable them to properly negotiate travel from one point to the next. In this respect, the signals can provide information relevant to the speed of a train, the allowability of the train to pass through or enter a particular area (for example a train station), and they can alert the driver to upcoming signal position or danger in the event of unusual or altered traffic conditions or an unforeseen accident having occurred.

Trains are generally extremely heavy vehicles and thus require significant distance to slow or stop. For this reason, signals generated at one point often need to be visible to the train driver well in advance of that point so that the train driver can take appropriate action in the event that an alteration to the speed of the train or other characteristic needs to be undertaken. Due to the limited sighting times caused by the high speed at which trains travel, it is necessary to ensure very accurate alignment of a signal relative to the rail line. It follows that the light signals which are used in railway networks, in particular in country areas, are usually formed as a focused beam of high intensity light. Currently, both LED and incandescent lighting is employed.

Because signals are often required to be visible to a train driver over a significant distance, the orientation or direction of the signals can require a high degree of accuracy. Typically the alignment accuracy must be within ±2.5°. Accordingly, when railway signalling is set, it is common for the alignment procedure to be time consuming and consultative to ensure accuracy of alignment.

While the need for accuracy is usually most acute in relation to high speed or high load railway networks, it is also applicable to urban railway networks, although the reaction distances involved in urban railway networks are usually not as great as those involved in country railway networks. Nevertheless, the same principles apply in urban railway networks, that train drivers must have good visual communication with the signalling so that they are accurately informed at all times in relation to driving conditions.

A major difficulty with post mounted signals, such as is commonly used in railway in urban railway networks, is that the signals periodically require maintenance, such as for lens cleaning, repairs, refurbishment and for general upkeep. Activities of this kind are generally difficult to undertake, given that the signal units (hereinafter the "signal head"), is normally mounted well above the ground, thus requiring ladder or scaffold access. Ladder access is typically the method used to reach a signal head, but that carries with it certain workplace risks for the worker who is elevated well above the ground. It needs to be appreciated that the worker will often have to carry out difficult maintenance tasks, often requiring both hands, and this places that worker at risk of falling from the ladder. Furthermore, in electrified railways, the signals are often close to electrical hazard areas, often making maintenance tasks more difficult.

One solution to the above problem has been to develop posts that can tilt so that the signal head can be shifted from an elevated position to a position closer to the ground and away from electrical hazard areas and where a worker can access the signal head without requiring elevation by ladder or scaffold. While that form of post reduces the potential for injury to the worker, it also has certain disadvantages.

A first disadvantage is that tilting posts will position the signal head facing in a certain direction so that access to some parts of the signal head is good and other parts awkward. To alleviate that difficulty, some mounting arrangements can be loosened so that the signal head can be shifted relative to the post and access to other parts of the signal head is improved. However when the signal head is moved, existing mounting arrangements do not necessarily allow the accurate return of the signal head to its position prior to being moved. Thus, the body of persons previously engaged to align the signal head must be engaged again if the signal head is to be certified as having the accuracy it is required to have. This increases the cost of the operation of maintaining the signal head, and also provides significant inconvenience by having to assemble different groups of personnel when a signal head is to be maintained.

Another drawback with the above arrangement which allows the signal head to be rotated, is that the arrangements available to date have generally had the disadvantage that they can also allow the signal head to be inadvertently released from the end of the post, if care is not taken to ensure that the signal head does not slip relative to the post. Accordingly, in posts that employ a tilt portion, if care is not taken to ensure that the portion which is tilted does not tilt below a 90° angle to vertical, there is the possibility that the signal head could slip off the post, thus preventing the potential for injury to the workers in the immediate vicinity and potential damage to the signal head itself.

Applicant has identified that that an improvement in the mounting of signal heads to posts can provide better access to the signal head for maintenance purposes and can improve the accuracy of alignment of the signal head when the head is returned to an operating position following maintenance.

SUMMARY OF THE INVENTION

The present invention provides a mounting arrangement for mounting a utility to an end of a post, the mounting arrangement including an attachment member for attachment to the post end whereby upon attachment of the attachment member to the post end, the attachment member is fixed against rotation relative to the post end, the mounting arrangement further including a rotatable member connected to the attachment member and being rotatable relative to the attachment member about an axis which is the same as or substantially parallel to the axis of the post end to which the attachment member is fixed, the rotatable member including a connection arrangement for connecting a utility to the rotatable member so that a utility which is connected to the rotatable member can rotate with the rotatable member relative to the attachment member and the post end, the rotatable member being rotatable from a first position at which a utility which is mounted to the rotatable member is properly positioned for operation, to a second position rotationally displaced from the first position, a cooperating arrangement being provided for cooperation with the rotatable member to facilitate accurate return of the rotatable member from the second position to the first position so that a utility which is connected to the rotatable member can be returned to the first position at which the utility is properly positioned for operation.

A mounting arrangement of the above kind advantageously provides two separate components, one of which is fixed to the post end (the attachment member) and the other of which is rotatable relative to the post end (the rotatable member). By the connection between those two components, the entire mounting arrangement can be securely fixed to the post end, thus avoiding the potential for the mounting arrangement to be released from the post end unexpectedly during a maintenance operation, while the second component (the rotatable member) allows a signal head which is connected to the mounting arrangement to be rotated, so that good access to all parts of the signal head can be provided.

Moreover, the mounting arrangement provides for accurate return of the rotatable component to its original position (the first position as described above) so that a signal head for example, can be returned to an aligned position without requiring the body of personnel that is usually required when a signal head is first aligned. That is, the signal head can be returned to its originally aligned position with confidence, given that the mounting arrangement provides a suitable cooperating arrangement of the kind described. Accordingly, in respect of a signal head, maintenance personnel can conduct suitable maintenance on the signal head, rotating it as required, and can then return the signal head to its original position, confident that it is correctly positioned for viewing by train drivers subsequent to the maintenance operation. The invention thus can reduce the cost of maintenance, by removing the labour intensive re-alignment process currently undertaken by a body of personnel, and can also facilitate better maintenance or easier maintenance of the signal head by allowing it to be rotated and thus providing better access to all parts of the signal head. In addition, where the signal head is mounted to a post which can tilt, or which includes a tilt portion, the head can be rotated once the post is tilted so that access to all parts of the signal head is available in the tilted condition.

It is expected that the invention will be very useful for adoption in relation to posts which include a tilt portion, or as they are known in the industry, "tilt masts", on the basis that tilt masts are regularly used in railway networks and, as described above, while providing advantages in relation to removing the need for ladder or scaffold access to the signal head, they nevertheless carry the potential that the signal head can slip off the end of the tilted portion. The invention can avoid this by the unique combination of a fixed attachment member and a rotatable member which is connected to the attachment member. In addition, in prior art arrangements where maintenance personnel fear that a signal head mounted to a prior art mounting arrangement might slip off the post end, they might elect not to rotate the signal head for access purposes (as that requires loosening of the mounting arrangement), so that the maintenance carried out on the signal head is carried out with the signal head in one position, which can be awkward for the maintenance personnel where access to portions of the signal head facing the ground is required. In the present invention, when that access is required, it is simply a matter of rotating the signal head on the rotatable member and good access can be provided.

In some forms of the invention, the return of the rotatable member to the first or operating position can be facilitated by cooperation of the rotatable member with the attachment member. Because the attachment member is fixed to the post end, the first position can be defined by the attachment member as the attachment member will not shift relative to the post end even during rotation of the rotatable member relative to the attachment member.

The attachment member can be fixed to a post end in any suitable manner. In some forms of the invention, the attachment member is attached to the post end by a friction fit. For this form of fixing, the attachment member can comprise a clamping arrangement by which a clamping load is applied to the outer surface of the post end. The clamping arrangement can be formed in any suitable manner and in some forms of the invention, the attachment member is formed in two parts, for example two halves, which are bolted together about the post end in bearing engagement with the outer surface of the post end. In this arrangement, the attachment member can comprise a pair of substantially half circular parts, which are placed about a post end (which is normally a cylindrical post end), and clamped in a friction fit against the outer surface of the post end. The two substantially semi-circular parts can be clamped by bolts or any other suitable arrangement.

Alternative arrangements to the friction fit discussed above could include bayonet type fittings between the attachment member and the post end, threaded fitting, or more permanent connections such as a welded fit. A different form of friction fit could include a wedge arrangement. Other forms of attachment can include screw connection such as using grub screws, or hose clamp style friction connection.

In order to enhance a friction fit arrangement, the attachment member can include one or more inwardly extending projections that provide a substantially point or line load against the outer surface of the post end when the attachment member is in place. In some forms of the invention, a pair of projections is provided, or three or four projections. The projections can be spaced apart equally about the circumference of the post end.

The above discussion has been made in relation to a post end which is cylindrical, which is expected to cover most of the post ends applicable to the invention. However, the invention is also applicable to post ends having a different shape, such as square, rectangular or hexagonal cross-section, or beams having a web and flange cross-section such as an I-beam, a 90° angle beam or a C-beam.

The amount of rotation between the rotatable member and the attached member can vary. In some forms of the invention, the rotation can be made through 360°, or a reduced amount of rotation can be provided as required for the particular installation. For example, it is expected that a 90° rotation might be all that is required for a railway signal head, on the basis that if the signal head is mounted to a tilt mast and is tilted to a position substantially horizontal with the ground, complete access to the signal head can be with the head in a non-rotated position and with a rotation through up to 90°. However, in other installations, or indeed for the signal heads, rotation through 140° or 180° have been raised as other potential useful ranges.

Thus, it will be evident, that the present invention can be provided with any suitable rotation range which is applicable to the particular installation in mind.

The attachment member and the rotatable member can be connected by any suitable arrangement and in some forms of the invention, a tongue and groove arrangement is provided. Such an arrangement can provide for high accuracy of positioning between the respective attachment and rotatable members and can also be used to limit the range of rotation as required. Thus, the groove which is provided in one of the attachment and the rotatable members can have a length that limits the amount of rotation of the rotatable member relative to the attachment member.

In one form of the invention, the rotatable member has a tongue that is received in a groove formed in the attachment member. In some forms of the invention, the tongue and groove connection holds the rotatable member firmly against the top of the post end so that any capacity for movement of the rotatable member off the post when the post is tilted is substantially eliminated. The connection can also prevent vertical movement of the rotatable member relative to the post when the post is upright. This assists the accuracy of axial alignment of a signal head which is fixed to the rotatable member.

Other arrangements used to connect the rotatable member to the attachment member can include a bearing arrangement, such as a slewing bearing, or any other arrangement that permits rotation but maintains axial alignment, such as a bolt or shaft extending through the central axis of the rotating member and extending for connection to the attachment member.

The cooperating arrangement between the rotatable member and the attachment member facilitates accurate return of the rotatable member to the first position at which the utility which is mounted to the rotatable member is properly positioned for operation. The cooperating arrangement can take any suitable form and for example can include an abutment whereby the rotatable member engages the abutment when the rotatable member is in the first position.

Where the cooperating arrangement includes an abutment, the abutment can be formed as part of the attachment member so that rotation of the rotatable member from the first position is rotation away from the abutment and return rotation is into engagement with the abutment. The rotatable member can likewise include an abutment so that upon engagement between the respective abutments, the rotatable member is at the first position.

An abutment of the above kind can be formed other than as part of the attachment member, and could, for example, be a separate component which is fixed to the post end. That separate component could then extend to a position at which it is engageable by the rotatable member when the rotatable member is in the first position. However, the preferred arrangement is to have the abutment formed as part of the attachment member as this simplifies the overall arrangement and it is relatively easy to form an abutment as part of the attachment member when the attachment member is being formed, such as by casting or machining, or by welding an abutment to the attachment member.

Another advantage of the abutment arrangement described above, is that the rotatable member can be secured in the first position by fixing the rotatable member to the abutment when the rotatable member has reached the first position. If the rotatable member also includes an abutment, then that fixing might include a bolt which extends between the respective abutments. The bolt may for example, extend through bores formed in both of the abutments.

Various other arrangements can be employed to maintain the rotatable member in the first position. Such further arrangements include the use of a bar which extends through an opening in the rotatable member and an opening formed in the attachment member or in the post end, with the openings being aligned when the rotatable member is in the first position and the bar being insertable through the respective openings upon alignment.

Still other arrangements can be employed which include tongue and groove arrangements, whereby a groove can have an end against which the tongue engages when the rotatable member is in the first position. What is required in any arrangement that is adopted is that the rotatable member be securely positioned in the first position and in most cases this is achieved by the use of a stop or an abutment as described above. Thus, bayonet and screw type arrangements are possible. A saw tooth or jagged edge arrangement is also possible. Also possible is an arrangement in which a locating hole is drilled in the post end for receiving a screw, such as a grub screw, which extends through the post or the attachment member.

Where the cooperating arrangement includes abutments, a pair of first and second abutments can be provided whereby the rotatable member engages each of the first and second abutments when it is in the first position. Those first and second abutments can be formed as part of the attachment member and in some forms, the abutments can be spaced apart at diametrically opposed positions to each other. The rotatable member can include a complementary pair of abutments to engage the first and second abutments of the cooperating arrangement. The use of a pair of first and second abutments can provide secure location of the rotatable member in the first position.

The present invention also includes arrangements whereby more than a pair of abutments is provided. Three or four abutments might be considered appropriate in order to provide accuracy to the return of the rotatable member to the first position.

While the mounting arrangement has been discussed above as providing relative rotation between the rotatable member and the attachment member to allow rotation of a utility which is attached to the rotatable member, other forms of adjustment can also be provided, such as to provide for adjustment in the vertical plane. This enables the mounting arrangement to accurately align a signal head for example, in each of the horizontal and vertical planes.

In some forms of the invention, the adjustment in the vertical plane is provided by a screw thread arrangement which connects between the rotatable member and the connection arrangement and by adjustment of the screw thread, the orientation of the connection arrangement (and thus a facility connected to the connection arrangement) can be adjusted relative to the rotatable member in the vertical plane.

In addition to providing a mounting arrangement according to the invention, the invention also provides an assembly comprising a pole with a mounting arrangement of the kind described above fitted thereto.

Moreover, the range of utilities that can be connected to a mounting arrangement of the present invention includes signal heads, railway and road lighting, or any device that needs to maintain a preset alignment from which it also needs to be shifted such as for maintenance purposes as discussed above. Many devices providing a visible signal or message (signage for example) would meet this requirement as would sound and/or image transmission devices such a radio antenna or other transmission devices.

BRIEF DESCRIPTION OF THE DRAWINGS

In order that the invention may be more fully understood, an embodiment will now be described with reference to the figures in which.

DETAILED DESCRIPTION OF THE DRAWINGS

Figure 1:
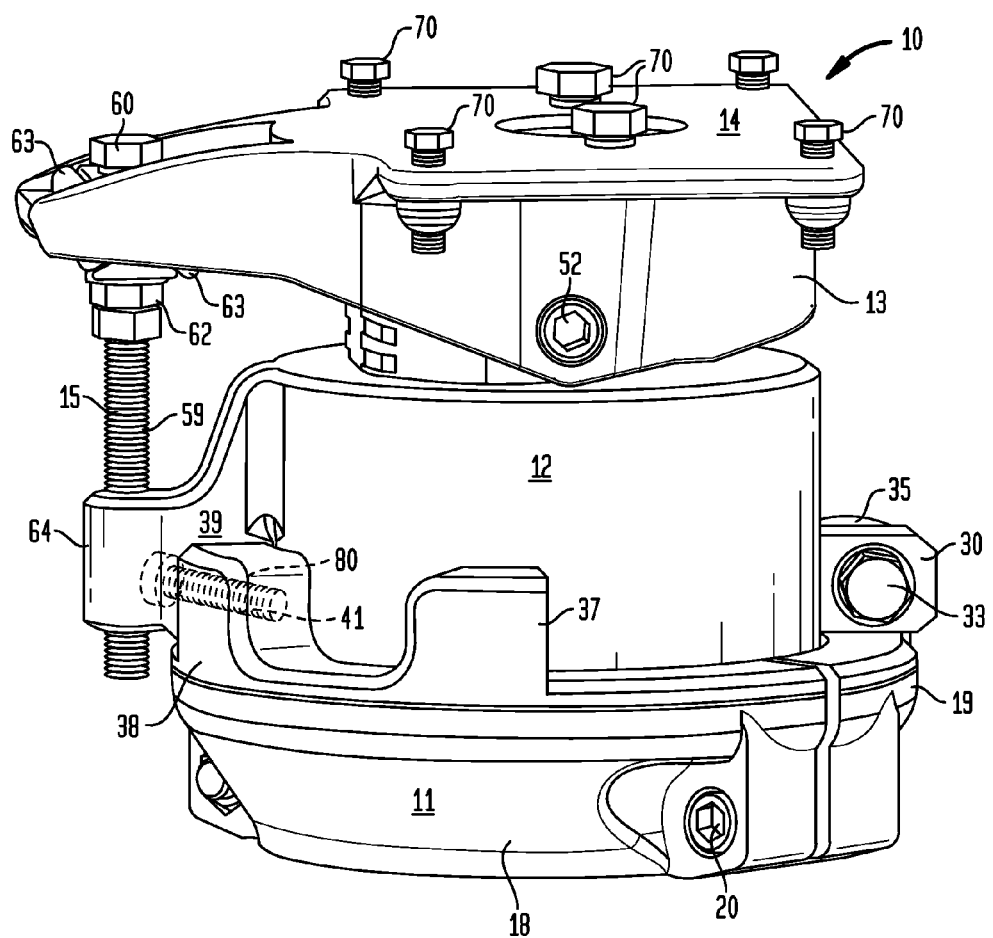
FIG. 1 is a perspective view of a mounting arrangement according to one embodiment of the invention.

FIG. 1 is a perspective view of a mounting arrangement 10 according to one embodiment of the invention. The mounting arrangement 10 includes an attachment member 11, a rotatable member 12 and a connection arrangement 13. The mounting arrangement 10 is intended to mount a utility, such as a railway signal head, to the upper surface 14 of the connection arrangement 13, while the attachment member 11 is arranged to be attached to the upper end of a supporting post (not shown in FIG. 1).

Figure 6:
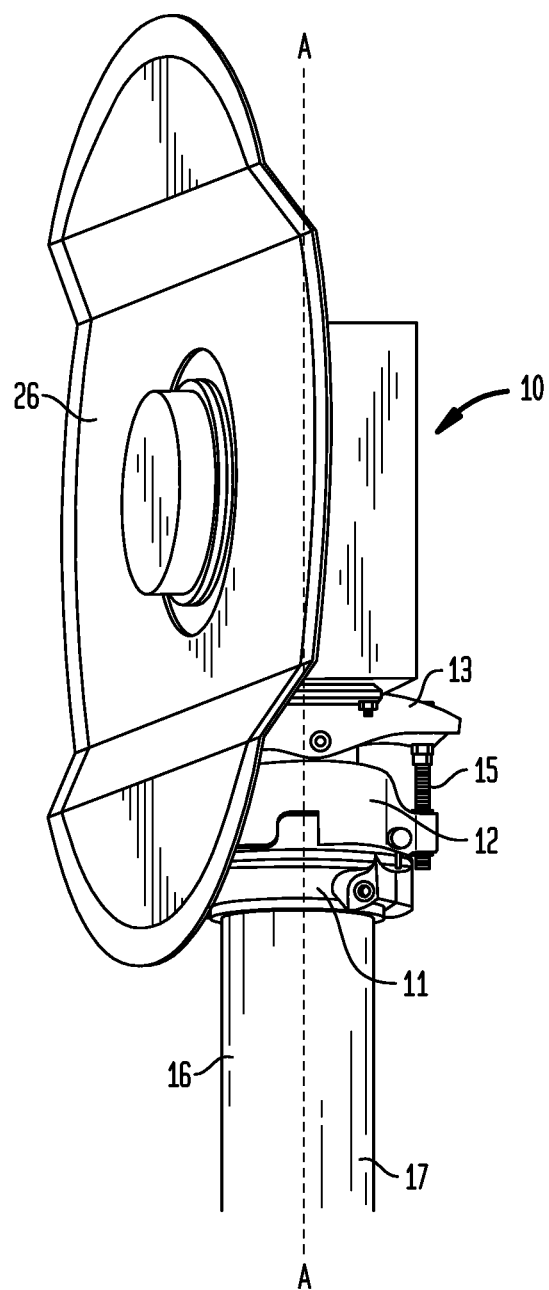
FIG. 6 is a side view of a signal head and a post connected together by the mounting arrangement of FIG. 1.

FIG. 6 illustrates an arrangement according to the invention, which shows a mounting arrangement 10 as described above, mounted to a post end 16 of a post 17. The facility 26 is in the form of a railway signal and is mounted to the mounting arrangement 10 on the opposite side of arrangement 10 from the post end 16. The facility 26 can be rotated about the longitudinal axis A of the post 17, and also through the vertical plane via the adjustment mechanism 15. Further reference to FIG. 6 will be made later herein.

Returning to FIG. 1, the attachment member 11 is intended to be fixed in position relative to a post (such as the post 17 of FIG. 6), while the rotatable member 12 is intended to be rotatable relative to the attachment member 11 and thus relative to the post. The connection arrangement 13 is fixed to the rotatable member 12 and thus rotation of the rotatable member 12 results in rotation of the connection arrangement 13 and any utility connected to the connection arrangement 13. An adjustment mechanism 15 allows adjustment of the connection arrangement 13 through a vertical plane relative to the rotatable member 12 and will described in more detail later herein.

Figure 2:
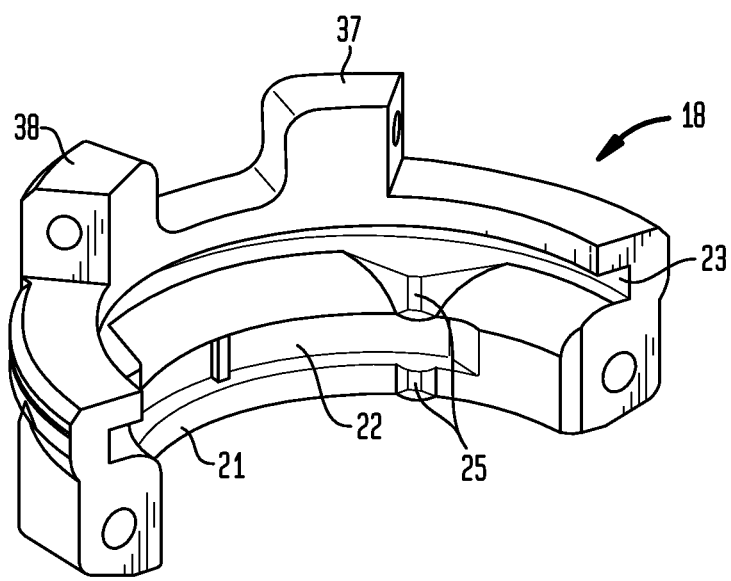
FIG. 2 illustrates a component of the attachment member of FIG. 1.

The attachment member 11 is formed of two substantially semi-circular parts 18 and 19 that are substantially identical and which bolt together via a nut and bolt arrangement 20. The part 18 is shown in FIG. 2 and this shows that the part 18 includes a semi-circular inner face 21, which includes a first groove 22 and a second groove 23. The first groove 21 allows an adaptor plate or collar (not shown) to be fitted to the mounting assembly to reduce the inner diameter of the attachment member 11 in order to fit the mounting arrangement 10 to a smaller outside diameter post. In the event that the post is sized for receipt within the attachment member 11 without an adaptor, the groove 22 is not used.

Figure 3:
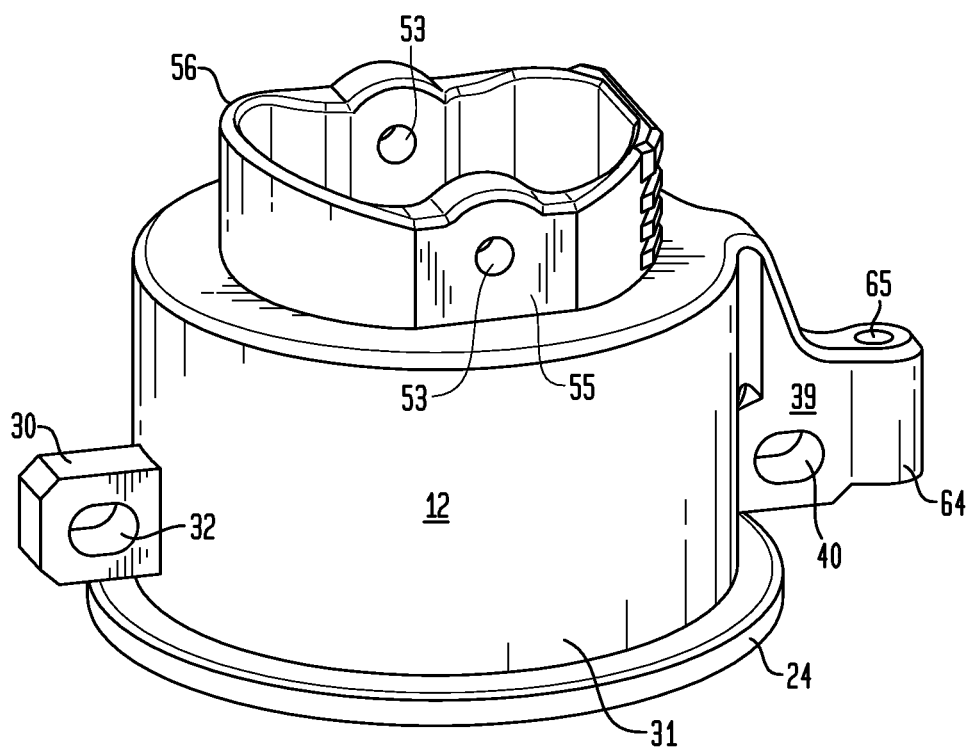
FIG. 3 is a view of the rotatable member of the mounting arrangement of FIG. 1.

The groove 23 accepts a tongue or flange which extends from the rotatable member 12. The flange 24 of the rotatable member 12 is shown in FIG. 3. The flange 24 is a continuous flange and the groove 23 of the attachment member 11 extends continuously through each of the parts 18 and 19.

Returning to FIG. 2, inwardly extending projections 25 are formed on the inner face 21 and those projections 25 engage the outer surface of a post end when the attachment member 11 is fixed to a post end. While only a pair of projections 25 is visible in FIG. 2, two sets of those projections are provided spaced apart in each of the parts 18 and 19 and thus four sets of those projections are provided by the combination of the parts 18 and 19. The projections 25 are generally equidistantly spaced apart and provide line contact with the surface of the post.

Returning to FIG. 1, it can be seen that by the bolt arrangement 20, the parts 18 and 19 can be fixed together. It will be appreciated that a bolt arrangement 20 is used at each end of the parts 18 and 19 to fix them together. There should always be a gap between the facing surfaces of the parts 18 and 19 that the bolt arrangement 20 extends through, as shown in FIG. 1.

With that fixing together of the parts 18 and 19, the attachment member 11 can be clamped to the post end and the flange 24 of the rotatable member 12 is fixed within the groove 23 of the parts 18 and 19, so that the attachment member 11 and the rotatable member 12 are fixed together. The dimensions of the flange 24 are such as to snugly or closely fit within the groove 23, so that there is minimal rocking or shifting movement of the rotatable member 12 relative to the attachment member 11 other than for rotational movement. Moreover, the rotatable member 12 is captured relative to the attachment member 11, so that while rotational movement of the rotatable member 12 is allowable, disengagement from the attachment member 11 is not. It follows that the rotatable member 12 can be fixed to a post end via the attachment member 11 for rotation relative to both the attachment member 12 and the post end, but otherwise the rotatable member 12 is not removable from the post end inadvertently unless the attachment member is disassembled.

Figure 4:
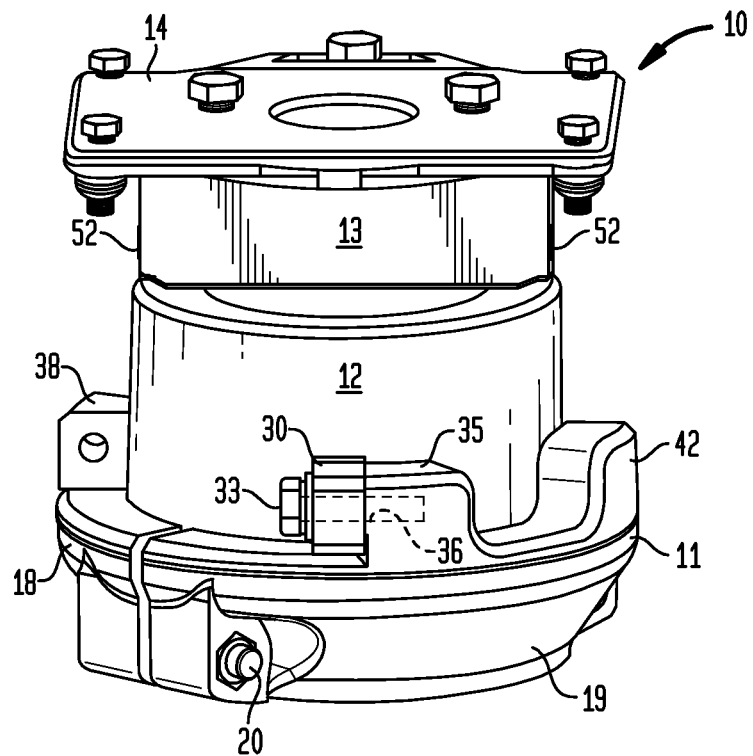
FIG. 4 illustrates the mounting arrangement of FIG. 1 rotated through 90° from the position shown in FIG. 1.

With reference to FIG. 3, the rotatable member 12 includes an abutment 30 extending from a side wall 31 of the member 12 and the abutment 30 includes an opening 32 through which a bolt can be passed. The bolt head 33 is shown in FIG. 1 and it will be appreciated that the bolt passes through the abutment 30. With reference to FIG. 4, a view of the mounting arrangement 10 is shown rotated through 90° from the position in FIG. 1 and in FIG. 4, the bolt head 33 is shown in side view. It will be appreciated that the threaded shaft of the bolt extends through the abutment 30 and into a threaded opening 36 of an abutment 35 of the attachment member part 19. With that threaded engagement, the rotatable member 12 is secured in place against rotation relative to the attachment member 11 and is thus secured relative to a post end to which the mounting arrangement 10 is fitted.

Returning to FIG. 2, the part 18, which is identical to the part 19, includes a pair of upstanding abutments 37 and 38, each of which includes a threaded opening. The part 19 has already been described as having an abutment 35, but it also includes a further abutment 42 (see FIGS. 1 and 4). Each of the abutments 35, 37, 38 and 42 include a threaded opening. Thus, the arrangement described in relation to FIG. 4, by which the abutment 30 of the rotatable member 12 is attached to the abutment 35, is available for attachment of an abutment of the rotatable member 12 (not just the abutment 30) to any of the abutments 35, 37, 38 and 42 of the parts 18 and 19 of the attachment member 11. With reference to FIGS. 1 and 3, it can be seen that the further abutment 39 of the rotatable member 12 is adjacent the abutment 38 of part 18 and in the same way as described in FIG. 4, a bolt 41 can extend through the opening 40 (see FIG. 3) of the abutment 39 and into a threaded opening of the abutment 38.

From the above discussion, it will be apparent that the rotatable member 12 can rotate between pairs of abutments of the parts 18 and 19. For example, in FIG. 4, rotation of the rotatable member 12 is restricted by engagement of the abutment 30 with each of the abutments 35 and 42. The same restriction applies to movement of the abutment 39 of the rotatable member 12, between the abutments 37 and 38. The abutments 30 and 39 can be fixed to either the abutments 35 and 38, or rotated 90° and fixed to the abutments 37 and 42. Fixing of the abutments 30 and 39 to the abutments 35 and 38 might be to fix the rotatable member 12 in the first position for operation of the signal head, while rotating the rotatable member 12 and fixing of the abutments 30 and 39 to the abutments to the abutments 37 and 42 might be for maintenance purposes.

With the rotatable member rotated to the position shown in FIGS. 1 and 4, bolts can be inserted through the respective abutments 30 and 39 and threadably engaged within the respective threaded openings of the abutments 35 and 38. By that arrangement, the rotatable member 12 is fixed securely in place relative to the attachment member 11 and with the attachment member 11 securely fixed to the post end, each of the rotatable member 12 and the attachment member 11 are securely fixed in position on the post end.

The connection arrangement 13 is fixed to the rotatable member 12. In the embodiment illustrated in the figures, the connection arrangement 13 is a separate component to the rotatable member 12 and is fixed thereto by an arrangement discussed below, but in other embodiments, the connection arrangement 13 could be formed as an integral part of the rotatable member 12.

Figure 5:
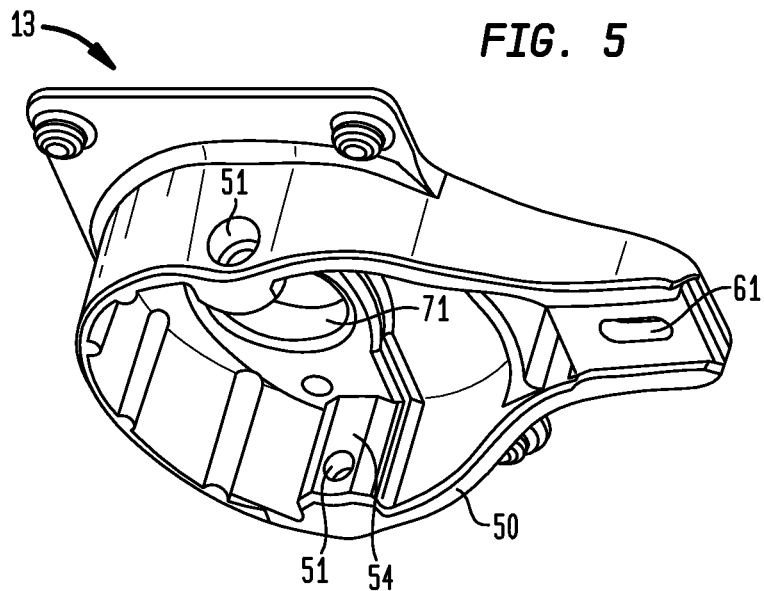
FIG. 5 illustrates the connection arrangement 13 from a perspective, underneath view.

The connection arrangement 13 is shown in side view in FIG. 1 and from a front end in FIG. 4. FIG. 5 illustrates the connection arrangement 13 from a perspective, underneath view. With reference to all of those figures, the connection arrangement 13 includes a skirt 50 (FIG. 5) through which openings 51 are formed at each of opposite sides of the skirt 50. The openings 51 are each arranged to accept a bolt 52 which also extends through the openings 53 of the rotatable member shown in FIG. 3. The openings 51 extend through a portion of the skirt 50 which includes a planar inner face 54, which is arranged for face-to-face engagement with a planar face 55 of an upstanding skirt 56 of the rotatable member 12. By the engagement between the respective planar faces 54 and 55, the connection arrangement 13 is prevented from rotating about the axis of the rotatable member 12, relative to the rotatable member 12.

However, the connection arrangement 13 is permitted movement about the axis of the bolt 52, but that movement is controlled by the adjustment mechanism 15 as illustrated in FIG. 1. That mechanism includes a threaded shaft 59 which is connected to the connection arrangement 13 through the oblong or elongate opening 61 (FIG. 5) and which is secured in place by the head 60 and the nut 62. Cup washers 63 (FIG. 1) are positioned on either side of the opening 61 so that the connection arrangement 13 can be rotated about the axis of the bolt 52 as it is adjusted. The cup washers are only visible in part in FIG. 1.

The threaded shaft 59 extends into a threaded opening 65 (FIG. 3) of an extension 64 of the abutment 39 of the rotatable member 12. By rotation of the shaft 59 within the threaded opening 65, the rotational position of the connection arrangement 13 can be adjusted up or down. It will be appreciated that the adjustment can be a relatively fine adjustment and is intended to orient the upper surface 14 of the connection arrangement 13 through a range of movement equal to several degrees. In some embodiments of the invention, the allowable movement can be in the order of ±10°, or up to ±20°.

The connection arrangement 13 includes a plurality of locating bolts 70 which extend through the upper surface 14, and which are used to fix a utility, such as a signal head, to the connection arrangement 13. The number of bolts can vary as can the position of the bolts to suit the utility being connected. Other arrangements can be used to make the connection.

The connection arrangement 13 further includes a central opening 71 (FIG. 5) to allow passage of a locating post of a utility to pass through the arrangement. Such a post might extend fully through the rotatable member 12 and the attachment member 11 as well as into the top of a post end to which the mounting arrangement 10 is fitted.

From the above discussion, it will be evident that the mounting arrangement 10 provides for secure connection to a post end, and for both secure connection of the rotatable member 12 to the attachment member 11 and for rotation of the rotatable member 12 relative to the attachment member 12 the post end. The arrangement further allows fine adjustment in the vertical plane by rotation of the connection arrangement 13 about the bolt 52.

Advantageously, the arrangement thus allows a utility which is fixed to the mounting arrangement 10 to be rotated through approximately 90°, so that service personnel can have good access to all parts of the utility, while if the arrangement 10 is used with a tilt mast, the secure attachment to the post end via the attachment member 11 means that the possibility of accidental displacement of the mounting arrangement 10 from the post end is avoided.

Figure 7:
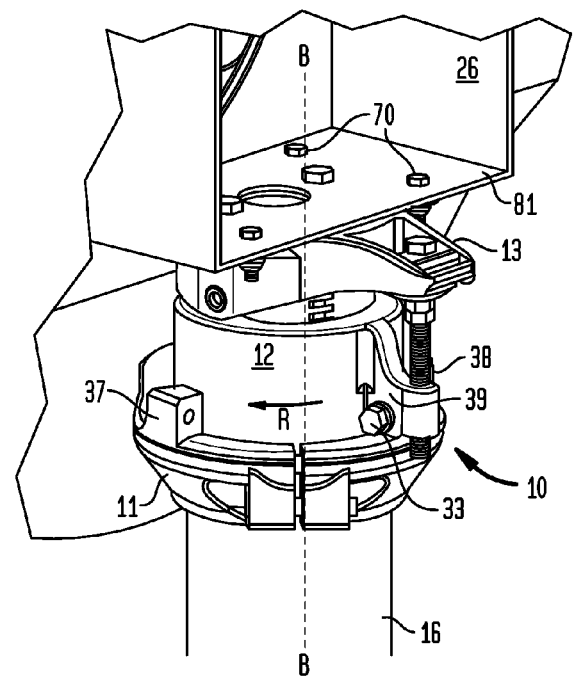
FIG. 7 is a rear perspective view of the mounting arrangement of FIG. 1 connected to post end and a signal head.

FIG. 7 shows a rear perspective view of the mounting arrangement 10 connected to the post end 16 on one side, and to a facility 26 on the other side. The facility 26 is a railway signal head, although the internals of the head are not shown. FIG. 7 shows the attachment member 11 being bolted to the post end 16 and securely attaching the mounting arrangement 10 to the post end 16. The rotatable member 12 is shown positioning the signal head 26 in an operational position, with a bolt 80 connecting the abutment 39 of the rotatable member 12 to the abutment 38 of the attachment member 11. Through that connection between the respective abutments 38 and 39, the signal head 26 is securely positioned in an operational position which was previously established when the signal head was first attached to the post end 16. It will be appreciated that a bolt connection is also made to the abutments which are not visible in FIG. 7, but which comprise the abutments 30 and 35 previously discussed.

The signal head 26 is rotatable through approximately 90° about axis B, which may be the same as or substantially parallel to axis A, by removal of the bolt 80 (and removal of the other bolt connecting the abutments 30 and 35), and rotating the rotatable member 12 in a clockwise direction R, to bring the abutment 39 into engagement with the abutment 37. The bolt 80 can then be used to secure the abutment 39 to the abutment 37. By this arrangement, the signal head 26 is rotated through approximately 90°, so that access to parts which were not previously easy to access can be accessed without difficulty. It will be appreciated that the abutment 30 which is not visible in FIG. 7 will also be rotated through 90° from engagement with the abutment 35, to engagement with the abutment 42 (see FIG. 1).

It will also be appreciated that bolting of the rotatable member in the new position for maintenance access is not always required. Maintenance may simply require rotation of the rotatable member 12 without fixing it in position in a newly rotated position.

When the signal head 26 is to be returned to its operational position, all that is required is that it be rotated in an anti-clockwise direction (the opposite direction to the direction R in FIG. 7) and the bolt 80 reinserted to connect the abutment 39 to the abutment 38. The same connection is made between the abutments 30 and 35. Given that the attachment member 11 has not been shifted relative to the post end 16 during rotation of the rotatable member 12, return of the rotational member 12 to bring the abutments 39 and 38 into engagement and the abutments 30 and 35 into engagement, returns the signal head 26 to the operational position extremely accurately. Thus, realignment processes which are undertaken when a signal head is first attached to a post are not required to be undertaken again.

Figure 8:
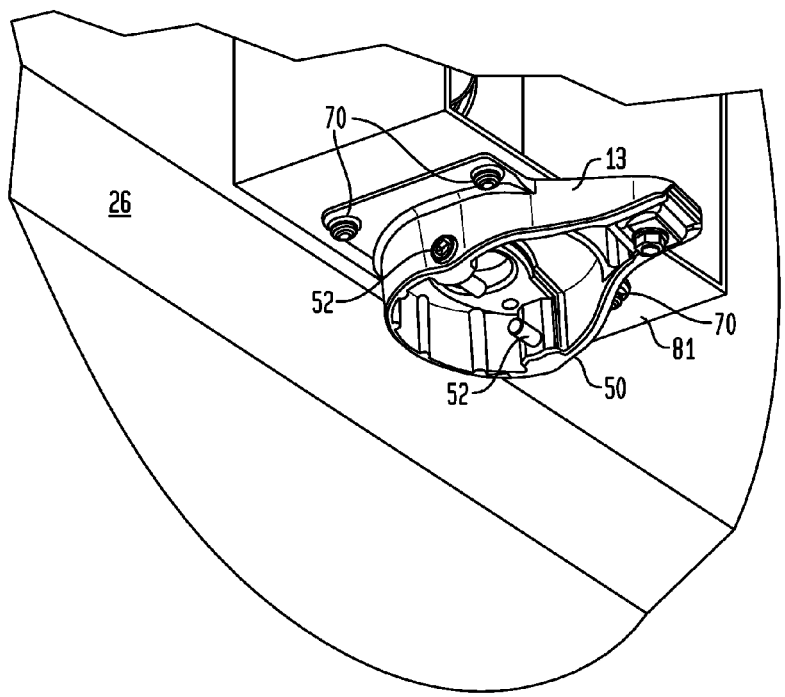
FIG. 8 is an underneath view of the signal head of FIG. 7 with a connection arrangement connected thereto.

FIG. 8 illustrates an underneath view of the signal head 26 and the connection arrangement 13. It can be seen from that view, that the bolt 52 as illustrated in FIGS. 1 and 4, is not a continuous bolt, but in fact is two separate bolts, which respectively thread into the threaded openings 51 of the skirt 50. Moreover, it can be seen from FIGS. 7 and 8 that the bolts 70 extend through a base plate 81 of a signal head 26 to firmly fix the signal head 26 to the connection arrangement 13.

A major advantage of the mounting arrangement 10 compared to the prior art mounting arrangements, is the accuracy with which a utility can be returned to the first or operating position from which it was displaced for maintenance purposes. Thus, when a utility, such as a signal head is being maintained, such as for cleaning or refurbishment, the bolts connecting the abutments 30 and 39 to the abutments 35 and 38 are removed and this allows the rotatable member 12 to be rotated relative to the attachment member 11. Thus, the maintenance personnel can conduct their maintenance, moving the signal head as required about the axis of the rotatable member.

When it comes time to return the signal head to its operating position, all that is necessary is for the rotatable member 12 to be rotated back to the position shown in FIG. 1 whereby the abutments 30 and 39 are brought into engagement with the abutments 35 and 38, and the bolts are thereafter inserted through the abutments 30 and 39 and into threaded engagement with the abutments 35 and 38. Upon that connection, the rotatable member 12 and thus the signal head is returned to a position from which it was displaced prior to maintenance. That return is not merely an approximate return, but an almost exact return and thus realignment of a signal head in the manner undertaken when a signal head is first installed on a post end, is not required. Tests have shown that the accuracy of realignment is sufficient without requiring a formal realignment procedure to be undertaken. That is, by returning the rotatable member 12 to the position shown in FIG. 1 after a maintenance activity has been carried out, the signal head mounted to the connection arrangement 13 will be returned to within an acceptable alignment range under which it needs to operate.

A critical feature of the mounting arrangement 10 is that the attachment member 11 is securely fixed to the post end. By that secure fixing, the abutments against which the abutments of the rotatable member 12 engage, will remain in their original position so that as soon as the rotatable member 12 is returned to engagement with those abutments, the rotatable member 12 and thus the signal head, will also be correctly returned to their original or first position. This differs from prior art arrangements, in which the rotatable member and the attachment member are effectively integrally formed so that if rotation of the mounting unit is made, the original reference point (provided in the present invention by the attachment member 11 of the mounting arrangement 10), is lost and thus the unit requires formal realignment.

The present invention is expected to provide significant advantages in terms of cost of maintenance of signal heads in railway networks. Moreover, there is an expectation that the cost of a mounting arrangement according to the invention will be the same, or only slightly greater than existing mounting arrangements. Thus, the invention is expected to provide significant advantages but without any major increase in cost.

Throughout the description and claims of this specification the word "comprise" and variations of that word, such as "comprises" and "comprising", are not intended to exclude other additives, components, integers or steps.

The invention described herein is susceptible to variations, modifications and/or additions other than those specifically described and it is to be understood that the invention includes all such variations, modifications and/or additions which fall within the spirit and scope of the present disclosure.

The invention claimed is:

1. A mounting assembly for mounting a utility to an end of a post, the mounting assembly comprising:
   an attachment member for attachment to the post end whereby upon attachment of the attachment member to the post end, the attachment member is fixed against rotation relative to the post end, the attachment member comprising an abutment;
   a rotatable member connected to the attachment member and being rotatable relative to the attachment member about an axis which is the same as or substantially parallel to the axis of the post end to which the attachment member is fixed,
   the rotatable member including:
      a connection assembly for connecting a utility to the rotatable member so that a utility which is connected to the rotatable member can rotate with the rotatable member relative to the attachment member and the post end, the connection assembly comprising a skirt for connecting the connection assembly to the rotatable member and an upper surface for connecting the utility to the connection assembly, and
      an abutment for engaging the abutment of the attachment member,
   the rotatable member being rotatable without displacement along the axis from a first position at which a utility which is mounted to the rotatable member is properly positioned for operation, to a second position rotationally displaced at least approximately 90 degrees from the first position; and
   a fastener that extends through the abutment of the rotatable member and into the abutment of the attachment member and secures the abutment of the rotatable member and the abutment of the attachment member together when the rotatable member is in the first position and not when the rotatable member is in the second position,
   wherein the abutment of the attachment member and the abutment of the rotatable member form a cooperating arrangement to facilitate accurate return of the rotatable member from the second position to the first position so that the utility which is connected to the rotatable member can be returned to the first position at which the utility is properly positioned for operation.

2. The mounting assembly according to claim 1, whereby the attachment member includes one or more projections for frictionally engaging with a facing outer surface of the post end.

3. The mounting assembly according to claim 1, the attachment member being formed in two parts that are connectable together and which, when connected together, define an aperture for receiving the post end, the two parts being movable relative to each other to bring the attachment member into clamping engagement with the post end.

4. The mounting assembly according to claim 3, the two parts of the attachment member being substantially identical.

5. The mounting assembly according to claim 1, the attachment member and the rotatable member being connectable by a tongue and groove arrangement, whereby the attachment member includes a groove and the rotatable member includes a tongue and the attachment member and the rotatable member are connected together for rotation when the tongue is located within the groove.

6. The mounting assembly according to claim 1, the abutment of the attachment member being formed as part of the attachment member.

7. The mounting assembly according to claim 1, the attachment member including a second abutment whereby the rotatable member engages each of the abutment and the second abutment of the attachment member when the rotatable member is in the first position.

8. The mounting assembly according to claim 7, the abutment of the attachment member and the second abutment of the attachment member being formed as part of the attachment member.

9. The mounting assembly according to claim 7, wherein the abutment of the attachment member and the second abutment of the attachment member are positioned substantially diametrically opposed to each other.

10. The mounting assembly according to claim 7, wherein the rotatable member includes a second abutment, the abutment of the rotatable member and the second abutment of the rotatable member configured to engage the abutment of the attachment member and the second abutment of the attachment member, wherein the rotatable member is maintained in the first position by the fastener which connects one of the abutments of the rotatable member to one of the abutments of the attachment member.

11. The mounting assembly according to claim 10, wherein the rotatable member is maintained in the first position by the fastener and a second fastener, each of the fastener and the second fastener connecting one of the abutments of the rotatable member to one of the abutments of the attachment member.

12. The mounting assembly according to claim 11, wherein the fastener is a bolt and the second fastener is a bolt.

13. The mounting assembly according to claim 1, the connection assembly being adjustable relative to the axis about which the rotatable member rotates.

14. The mounting assembly according to claim 13, the connection assembly being adjustable through an axis which is substantially perpendicular to the axis about which the rotatable member rotates.

15. The mounting assembly according to claim 1, wherein the fastener is a bolt.

16. An upright pole including the mounting assembly according to claim 1 mounted to an end of the pole and a utility mounted to the mounting assembly.

* * * * *